B. G. SIMMONS.
DENTAL PELLET.
APPLICATION FILED NOV. 16, 1921.

1,438,064.                                    Patented Dec. 5, 1922.

Inventor
Bert G. Simmons
By Jac H. Richmond
Attorney

Patented Dec. 5, 1922.

1,438,064

UNITED STATES PATENT OFFICE.

BERT G. SIMMONS, OF NEW BRUNSWICK, NEW JERSEY, ASSIGNOR TO JOHNSON & JOHNSON, OF NEW BRUNSWICK, NEW JERSEY, A CORPORATION OF NEW JERSEY.

DENTAL PELLET.

Application filed November 16, 1921. Serial No. 515,599.

*To all whom it may concern:*

Be it known that I, BERT G. SIMMONS, a citizen of the United States, residing at New Brunswick, in the county of Middlesex and State of New Jersey, have invented certain new and useful Improvements in Dental Pellets, of which the following is a specification.

This invention relates to pellets for use in dental operations, for drying cavities in teeth, for medicating purposes as dental dressings, and for temporary stopping in holding dressings in place in the treatment of teeth.

Heretofore, the dentist has improvised pellets from a mass of absorbent cotton, or has employed a loose ball-like mass of spirally spun fibrous absorbent cotton. Such pellets are objectionable because their fuzzy exterior causes them to adhere to one another; tends to collect dust; makes them difficult of introduction into the cavity; and constitutes an irritant.

The object of my invention is to provide a pellet of greater absorbent properties than any heretofore in use, which is externally smooth, and which normally is in a state of compression, but which expands quickly in response to heat and moisture as when applied to the cavity of a tooth.

The invention resides in the product and in the method of making it, hereinafter described and finally set forth in the claims.

In the accompanying drawing forming a part hereof,

All of the views are on an enlarged scale.

Figure 1:
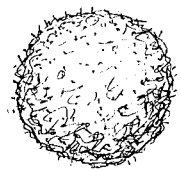
Figure 1 is an elevational view of the ordinary pellet.
Figure 2:
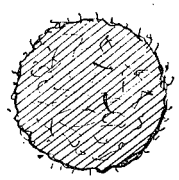
Fig. 2 is a section thereof.

It will be noted that the ordinary commercial pellet, Figs. 1 and 2, is externally rough and has considerable fuzz or nap which readily picks up moisture and greatly enlarges or expands the pellet and seriously interferes with the proper application of the same to the cavity of a tooth.

Figure 3:
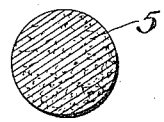
Fig. 3 is a sectional view of a compressed pellet.
Figure 4:
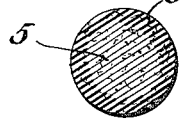
Fig. 4 is a sectional view of a compressed and coated pellet.
Figure 5:
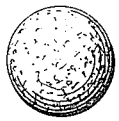
Fig. 5 is a perspective view of the finished pellet.

In practicing the invention, pellets 5 of cotton, or other absorbent material, are compressed to substantially spherical form as in Fig. 3 and enveloped in a protecting sheath or medium 6 capable of holding them in a state of compression and of compacting or obliterating any external fuzz or nap, so that the pellets are externally smooth, and may be packed in quantities without liability of adhering to one another, and may be readily applied to the cavity of a tooth.

The nature of the envelope must be such that it is soluble or fugitive, that is to say, instantly responsive to heat and moisture, so that when the pellet is introduced into the cavity of a tooth it will expand quickly and adapt itself to all of the walls thereof. A size such as dextrinized starch, gum tragacanth, gelatin, and the like fulfills the stated requirements.

The pellets are coated with a thin film of sizing during the process of forming and pressing.

The compressed state of the pellet and its smooth exterior makes it easy of introduction into a cavity, and quickens and increases its absorbent properties.

Having described my invention, I claim:—

1. A dental pellet consisting of a body of absorbent material in a state of compression and a smooth coating for the same.

2. A dental pellet consisting of a compressed body of absorbent material and a smooth soluble coating for the same.

3. A dental pellet having a smooth surface, said pellet embodying a compressed mass of absorbent material and means whereby it may be so applied to the cavity of a tooth, said means consisting of a coating of the nature of size.

4. The method of making dental pellets of marked absorptive properties and free from external fuzz or nap, which consists in compressing a body of absorbent material, and coating it, while in a compressed plate, with a fuzz-laying substance.

In testimony whereof I affix my signature.

BERT G. SIMMONS.